United States Patent
Smidler

(10) Patent No.: US 7,114,762 B2
(45) Date of Patent: Oct. 3, 2006

(54) SIDEWALL OF A SEMI-TRAILER HAVING A HIGH BASERAIL

(75) Inventor: Francis S. Smidler, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 10/762,738

(22) Filed: Jan. 22, 2004

(65) Prior Publication Data
US 2004/0232728 A1 Nov. 25, 2004

Related U.S. Application Data

(60) Provisional application No. 60/443,622, filed on Jan. 30, 2003.

(51) Int. Cl.
*B60J 7/00* (2006.01)
(52) U.S. Cl. ..................... 296/186.1; 296/199
(58) Field of Classification Search ............ 296/186.1, 296/182.1, 191, 199; 52/309.1, 578, 580; 105/409
See application file for complete search history.

(56) References Cited

U.S. PATENT DOCUMENTS

| | | | |
|---|---|---|---|
| 2,172,571 A | 9/1939 | Theriault | |
| 2,322,088 A | 6/1943 | Black | |
| 2,384,965 A | 9/1945 | Reid | |
| 4,015,876 A | 4/1977 | Hulverson et al. | |
| 4,212,405 A | 7/1980 | Schmidt | |
| 4,357,047 A | 11/1982 | Katz | |
| 4,685,721 A | 8/1987 | Banerjea | |
| 4,703,948 A | 11/1987 | Ehrlich | |
| 4,940,279 A * | 7/1990 | Abott et al. | ............. 296/186.1 |
| 4,958,472 A | 9/1990 | Ehrlich | |
| 5,286,079 A | 2/1994 | Zubko et al. | |
| 5,439,266 A * | 8/1995 | Ehrlich | .................... 296/186.1 |
| 5,509,714 A | 4/1996 | Schmidt | |
| 5,860,693 A | 1/1999 | Ehrlich | |
| 5,997,076 A | 12/1999 | Ehrlich | |
| 6,220,651 B1 | 4/2001 | Ehrlich | |
| 6,412,854 B1 * | 7/2002 | Ehrlich | ....................... 296/191 |
| 6,527,335 B1 * | 3/2003 | Yurgevich | ................ 296/186.1 |

FOREIGN PATENT DOCUMENTS

WO WO 8300467 2/1983

* cited by examiner

*Primary Examiner*—Stephen Gordon
(74) *Attorney, Agent, or Firm*—Trexler, Bushnell, Giangiorgi, Blackstone & Marr, Ltd

(57) ABSTRACT

A sidewall for a semi-trailer is provided. The sidewall includes composite side panels, a baserail and a splicing member. The panels are formed of inner and outer skins and a core member therebetween. An upper portion of the panels is secured to a top rail of the semi-trailer. A lower portion of the baserail is secured to a bottom rail of the semi-trailer. The upper portion of the baserail and the lower portion of the panels overlap such that an outer surface of the baserail is positioned against the inner skin of the panels. The upper portion of the baserail and the lower portion of the panels are secured together by the splicing member which is positioned against the outer skin of the panels, and the outer surface of the baserail. The splicing member also supports the panels at the bottom end thereof.

37 Claims, 5 Drawing Sheets

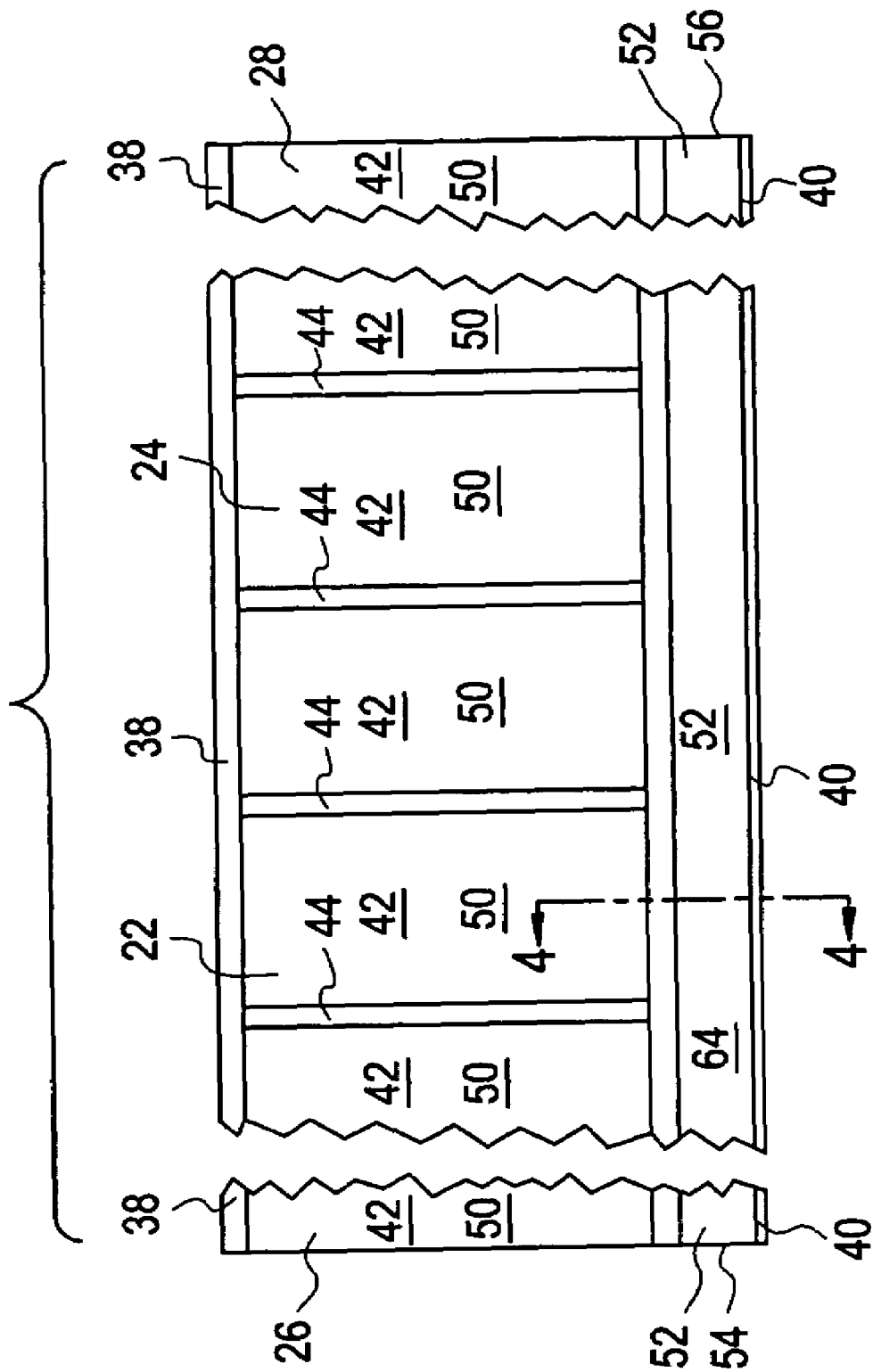

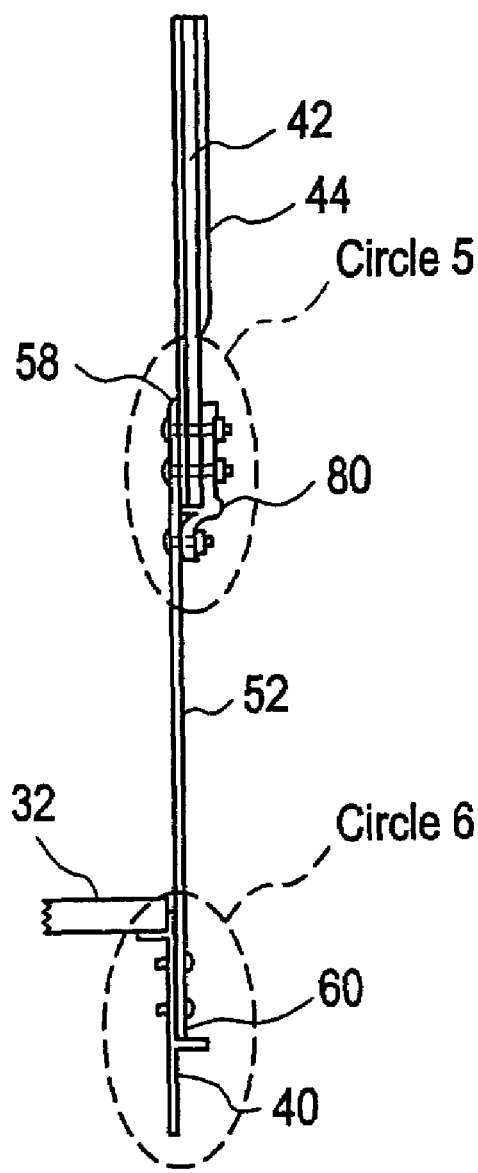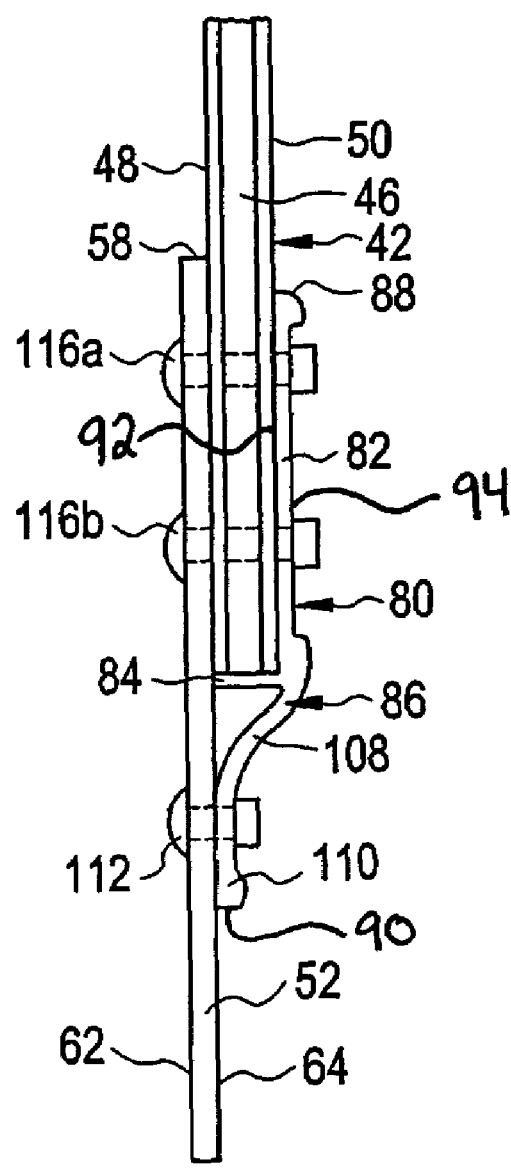

SIDEWALL OF A SEMI-TRAILER HAVING A HIGH BASERAIL

CROSS-REFERENCE

This patent application claims the benefit of domestic priority of U.S. Provisional Application Ser. No. 60/443,622, filed Jan. 30, 2003, and entitled "High Baserail For A Semi-Trailer".

BACKGROUND OF THE INVENTION

The present invention relates to a sidewall of a semi-trailer having a high baserail. More specifically, the present invention relates to a sidewall of a semi-trailer having a high baserail where the sidewall is formed of a plurality of composite side panels.

A semi-trailer 20 of the prior art is shown in FIG. 1. The semi-trailer 20 can be connected to a tractor (not shown) by conventional means, such as a fifth wheel assembly (not shown). The semi-trailer 20 includes a body 22 formed from a pair of rectangular sidewalls 24, a front wall 26, rear doors 28, a top panel or roof 30, and a bottom panel or floor 32. The floor 32 is supported by a conventional rear undercarriage assembly 34 and has a landing gear 36 secured thereunder. The roof 30 and an upper portion of the sidewalls 24 are secured to a top rail 38. The floor 32 and a lower portion of the sidewalls 24 are secured to a bottom rail 40.

Each sidewall 24 includes a plurality of vertical upstanding composite side panels 42 joined together by a joint configuration 44, preferably of the type disclosed in any one of U.S. Pat. Nos. 4,958,472, 5,860,693, 5,997,076, 6,220,651 and 6,412,854, all of which are owned by the assignee of the present application. Each composite side panel 42 includes a plastic core member 46 sandwiched between an inner thin metal skin 48 and an outer thin metal skin 50 bonded thereto by a suitable known adhesive or other like means.

The inner skin 48 and the outer skin 50 are preferably approximately 0.026 inches thick. The skins 48, 50 are preferably made of aluminum; galvanized, full hardened steel, such as AISI Grade E full hard steel because of its cost effectiveness, or the like. Preferably, the outer skin 50 is made of ASTM G90 galvanized steel and the inner skin 48 is made of ASTM G60 galvanized steel. Aluminum may be used, but it may be tool soft for some purposes and strength and punch resistance are sacrificed, however, aluminum is lightweight. Typically, each composite side panel 42 is four feet in width, but can be longer or shorter depending on the application.

Each core member 46 is made of some type of compressible non-metal material, preferably thermoplastic, such as polypropylene or high density polyethylene. These materials are relatively inexpensive as compared to aluminum found in prior semi-trailer wall constructions. In addition, because a composite side panel 42 is used, the weight of the semi-trailer construction is reduced over semi-trailers having aluminum sidewalls.

The semi-trailer 20 having sidewalls 24 formed of composite side panels 42 typically rests on the bottom rail 40 such that the outer skin 50 extends all the way down to the bottom rail 40. The bottom rail 40 also typically has a vertical section 47 which is about six (6) inches high, against which the inner skin 50 of the composite side panels 42 abuts against, as illustrated in FIG. 2. A scuff plate 49 is also positioned against the inner skin 50 of the composite side panels 42 and is positioned above the vertical section 47 of the bottom rail 40. The composite side panels 42 are secured to both the vertical section 47 of the bottom rail 40 and to the scuff plate 49 by rivets 51. The vertical section 47 and the scuff plate 49 typically run the entire length of the sidewall 24 of the semi-trailer 20 from the front wall 26 to the rear doors 28. The scuff plate 49 is provided to protect the composite side panels 42 from damage by contact with goods and/or loading equipment such as a fork lift truck.

While the use of semi-trailers 20 having sidewalls 24 formed of composite side panels 42 has been met with much praise in the industry because they are both lightweight and strong, these semi-trailers do have some disadvantages associated therewith.

For example, the outer surface of the composite side panels 42 are susceptible to damage proximate to the bottom rail 40 caused from sideswipes by other semi-trailers, typically during docking. Also, if the composite side panels 42 are damaged either by sideswipes or by a forklift, such that replacement thereof is necessary, the construction of the sidewalls 24 does not allow for the easy replacement thereof or easy repair thereof.

Thus, there is a need for a sidewall construction for a semi-trailer using composite side panels which overcomes the aforementioned disadvantages. The present invention provides such a sidewall construction for a semi-trailer using composite side panels.

OBJECTS AND SUMMARY OF THE INVENTION

A primary object of the invention is to provide a sidewall construction for a semi-trailer which is designed to prevent damage to the sidewall.

Another primary object of the invention is to provide a sidewall construction for a semi-trailer which is designed to allow for the easy repair or replacement of the baserail of the sidewall.

Another primary object of the invention is to provide a sidewall construction for a semi-trailer which is designed to allow for the easy repair of the composite side panels of the sidewall.

An object of the invention is to provide a sidewall construction for a semi-trailer which utilizes an extrusion to secure the composite side panels to the high baserail, where the extrusion further acts as a rubrail on the exterior of the semi-trailer.

An object of the invention is to provide a sidewall construction for a semi-trailer which has an inset provided proximate to the bottom rail in order to help prevent damage of the sidewall.

Briefly, and in accordance with the foregoing, the invention provides a construction of a sidewall for a semi-trailer. The sidewall includes a plurality of composite side panels, a baserail and a splicing member. The composite side panels are formed of an inner skin, an outer skin and a core member between the inner and outer skins. An upper portion of the composite side panels are secured to a top rail of the semi-trailer. A lower portion of the baserail is secured to a bottom rail of the semi-trailer. The upper portion of the baserail and the lower portion of the composite side panels overlap one another such that an outer surface of the baserail is positioned against the inner skin of the composite side panels. The upper portion of the baserail and the lower portion of the composite side panels are secured together by a splicing member which is positioned against the outer skin of the composite side panels, and the outer surface of the baserail below the bottom end of the composite side panel.

The splicing member also supports the composite side panels at the bottom end thereof.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which:

FIG. 3 is a side-elevational view of an outer surface of a sidewall of a semi-trailer which incorporates features of the present invention;

FIG. 4 is a cross-sectional view of the sidewall of the semi-trailer taken along line 4—4 in FIG. 3;

FIG. 5 is an enlarged view of the cross-sectional view of the sidewall of the semi-trailer of FIG. 4 taken from circle 5;

DETAILED DESCRIPTION OF THE ILLUSTRATED EMBODIMENT

Figure 2:
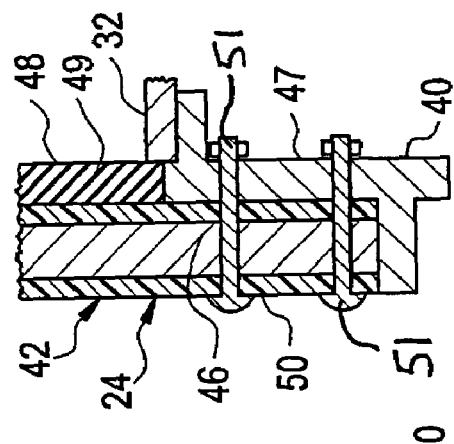
FIG. 2 is a cross-sectional view of a portion of the prior art semi-trailer of FIG. 1 taken along line 2—2, illustrating the bottom rail, the composite side panel and the scuff plate.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

Figure 1:
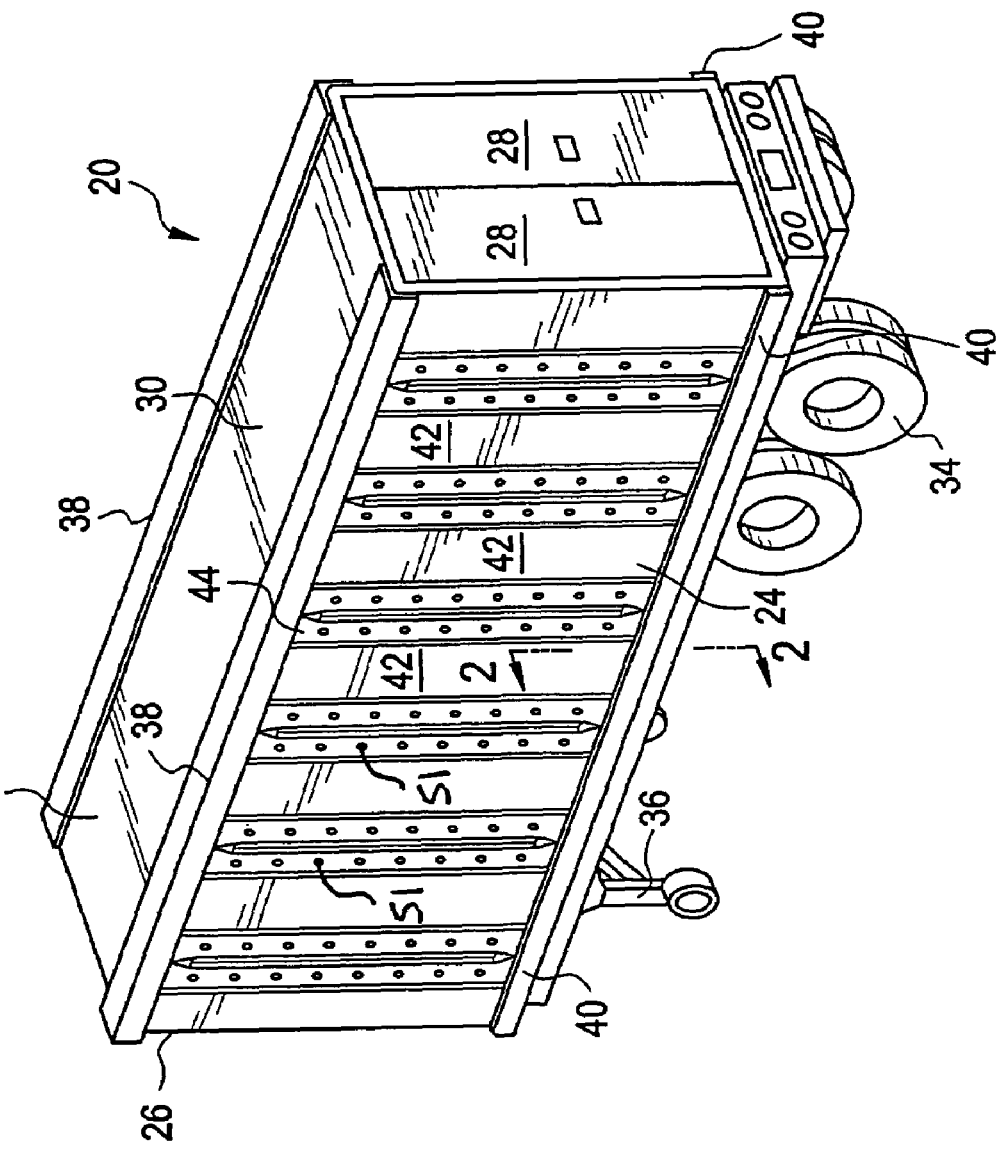
FIG. 1 is a perspective view of a prior art semi-trailer.

The present invention provides a modification to the prior art semi-trailer 20 shown in FIGS. 1 and 2 in that the floor 32 and the lower portions of the composite side panels 42 are separated from the bottom rail 40 by baserails 52 which have a significant height, as illustrated in FIG. 4. The baserails 52 are preferably formed of metal, such as aluminum, although it is to be understood that other similar materials could also be used to form the baserails 52. Aluminum, however, is the preferred material as it is a strong material, yet a lightweight material.

Each baserail 52 is generally rectangular such that it has a front end 54, a rear end 56, a top end 58, a bottom end 60, an inner surface 62 and an outer surface 64. The baserail 52 preferably continuously extends the length of the semi-trailer 20 (from the front wall 26 to the rear doors 28), such that it may have, for example, a length of up to fifty-two (52) feet, which is defined as the distance from the front end 54 of the baserail 52 to the rear end 56 of the baserail 52. Alternately, the baserail 52 can be formed of multiple panels joined together, either to one another or by a splice plate. The baserail 52 typically has a height of twenty-two (22) inches, which is defined as the distance from the top end 58 of the baserail 52 to the bottom end 60 of the baserail 52. The sidewall 24 of the semi-trailer 20, which includes the baserail 52 and the composite side panels 42, typically has a height of approximately nine and a half (9.5) to ten (10) feet. Thus, the baserail 52 generally accounts for approximately one-fifth of the height of the sidewall 24. The baserail 52 typically has a thickness of nineteen-hundredths (0.190) of an inch, which is defined as the distance from the inner surface 62 of the baserail 52 to the outer surface 64 of the baserail 52. It should be understood that the exact described dimensions are the preferred dimensions, but should not be construed to be limiting features of the baserail 52 as the dimensions of the baserail 52 are dependent on the size and type of semi-trailer 20 on which the baserail 52 is to be provided.

Figure 6:
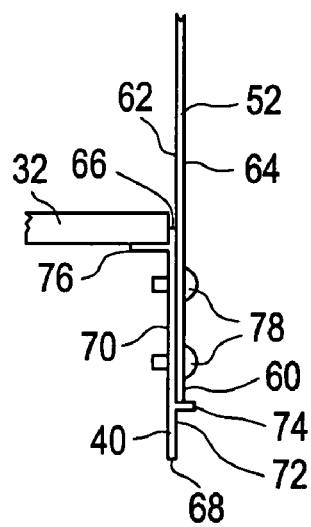
FIG. 6 is an enlarged view of the cross-sectional view of the sidewall of the semi-trailer of FIG. 4 taken from circle 6.

As illustrated in FIGS. 4 and 6, a lower portion of the baserail 52, proximate to the bottom end 60 of the baserail 52, is connected to the bottom rail 40. The bottom rail 40 is best illustrated in FIG. 6 and is preferably an extrusion formed of a high strength material. The bottom rail 40 has a base 70, a first flange 74 which extends outwardly from the base 70 proximate to a bottom end 68 thereof, and a second flange 76 which extends inwardly from the base 70 proximate to a top end 66 thereof. The first flange 74 extends outwardly from the base 70 a distance which is preferably at least as large as the thickness of the baserail 52. The second flange 76 assists in the connection of the bottom rail 40 to the floor 32, which will not be discussed herein as such a connection is well known in the art.

The bottom end 60 of the baserail 52 is positioned on top of the first flange 74 of the bottom rail 40 such that the inner surface 62 of the baserail 52, at the lower portion thereof, abuts against an outer surface 72 of the base 70. The lower portion of the baserail 52 and the base 70 are connected together by a plurality of rivets 78.

As illustrated in FIGS. 4 and 5, an upper portion of the baserail 52, proximate to the top end 58 of the baserail 52, is connected to a lower portion of the composite panel 42 by a splicing member 80. The splicing member 80 is best illustrated in FIG. 5 and is preferably a continuous extrusion formed of a high strength material. Alternately, the splicing member 80 can be formed of multiple extrusions joined together, either to one another or by a splice plate. The splicing member 80 has a first portion 82, a second portion 84 and a third portion 86, all of which are preferably integrally formed.

The first portion 82 extends from a top end 88 of the splicing member 80 to the second and third portions 84, 86. The first portion 82 is generally straight and has an inner surface 92 and an outer surface 94.

The second portion 84 is generally straight, extends generally perpendicularly from the first portion 82 and extends inwardly from the first portion 82. The second portion 84 extends inwardly a distance which is preferably at least as large as the thickness of the composite panel 42.

The third portion 86 extends from the first portion 82 to a lower end 102 of the splicing member 80. The third portion 86 has a curved portion 108 and a straight portion 110. The curved portion 108 extends from the third portion 86 to the straight portion 110. The straight portion 110 extends from the curved portion 108 to the lower end 102. The straight portion 110 of the third portion 86 is parallel with the first portion 82.

In the formation of the semi-trailer 20 of the present invention, a lower portion of the inner skin 48 of the composite panel 42 is sandwiched between an upper portion of the baserail 52 and the first portion of the splicing member 80. The straight portion 110 of the splicing member 80 is positioned against the baserail 52. The ends of the composite side panels 42 and the joint configurations 44, where provided, are positioned proximate to, and preferably abut against and sit upon, the second portion 84 of the splicing member 80.

The splicing member 80, the composite side panels 42, the joint configurations 44, where provided, and the baserail 52 are connected together by rivets 112, 116a, 116b. Rivets 112 extend through the baserail 52 and the straight portion 110 of the third portion 86 of the splicing member 80. Rivets 116a, 116b extend through the baserail 52, the composite side panels 42, the joint configurations 44, where provided, and the first portion 82 of the splicing member 80. Some of the rivets 116a extend through the first portion 82 of the splicing member 80 proximate to the first end 88 thereof, while the remainder of the rivets 116b extend through the first portion 82 of the splicing member 80 proximate to the second end 90 thereof.

Figure 7:
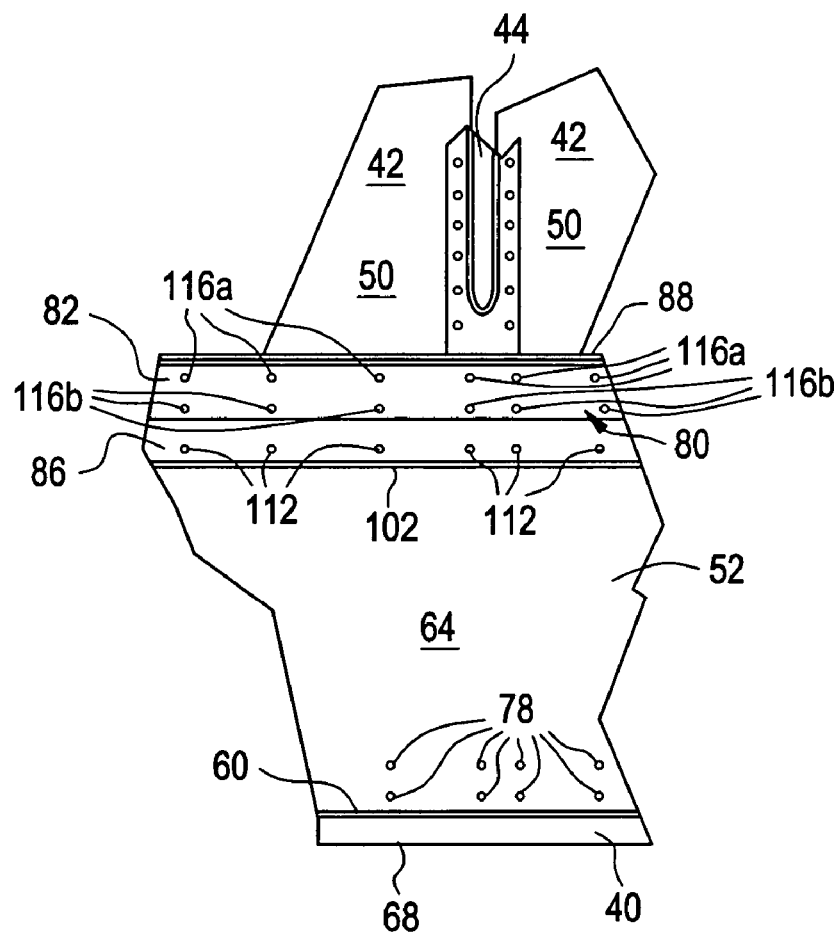
FIG. 7 is partial side-elevational view of the outer surface of the sidewall of the semi-trailer.
Figure 8:
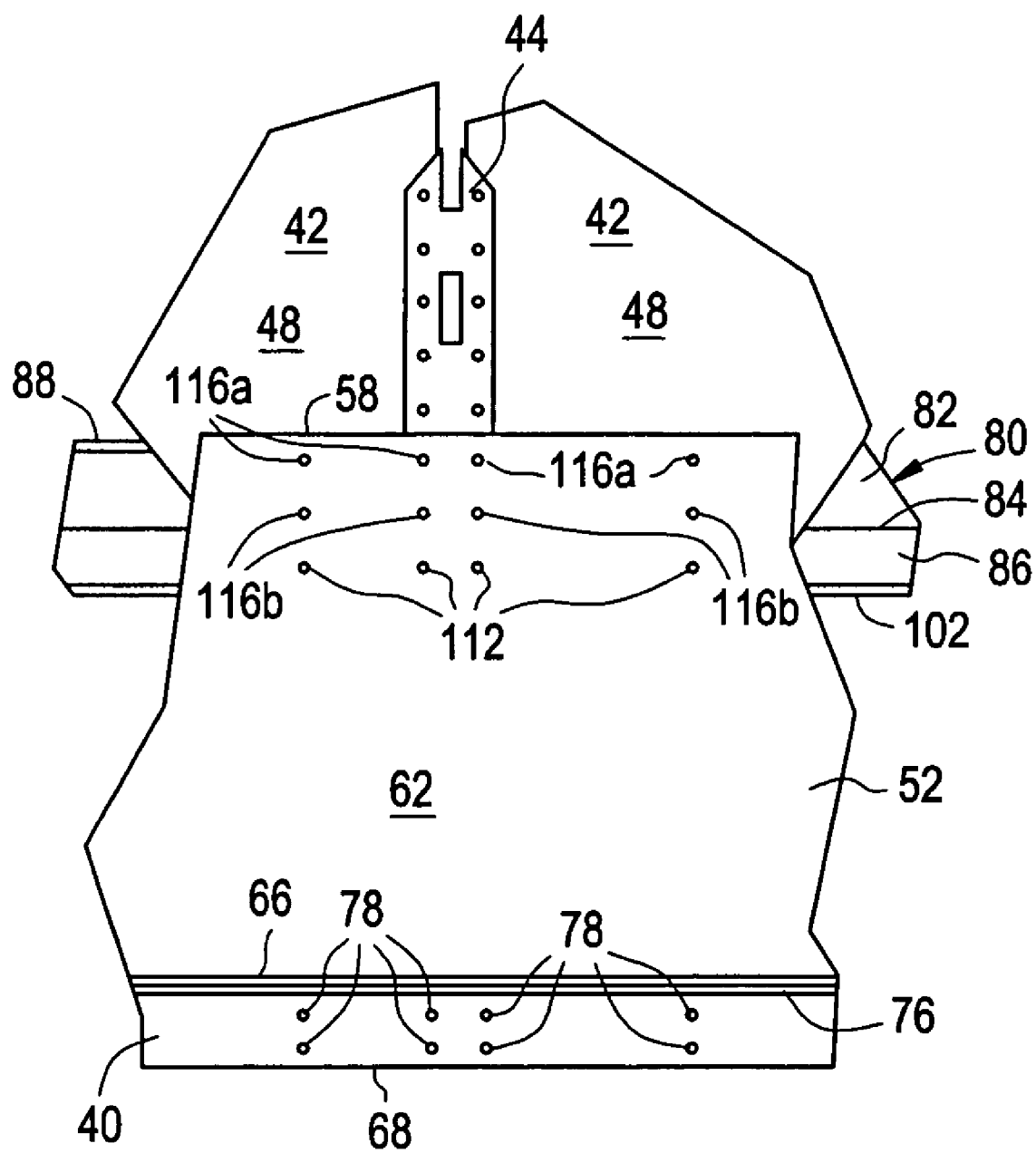
FIG. 8 is a partial side-elevational view of the inner surface of the sidewall of the semi-trailer.

An outside view of the semi-trailer 20 of the present invention having the baserail 52 is illustrated in FIG. 7 and an inside view of the semi-trailer 20 of the present invention having the baserail 52 is illustrated in FIG. 8.

The semi-trailer 20 of the present invention having sidewalls 24 formed with the baserail 52, the composite side panels 42 and the splicing member 80, has a number of advantages over the semi-trailer 20 of the prior art.

First of all, the positioning of the baserail 52 between the composite side panels 42 and the bottom rail 40 helps to prevent, or at least minimize, damage to the composite side panels 42. In the prior art semi-trailer 20, the composite side panels 42 would typically be damaged proximate to the bottom rail 40 due to sideswipes by other semi-trailers, typically during docking, or by the forklift scraping or puncturing the composite side panels 42 from the interior of the trailer 20. Such sideswipes or forklifts could punch through or rip a hole in the composite side panels 42, thus necessitating the repair or replacement of the composite side panels 42, which may be a very cumbersome project. The baserail 52, however, is stronger than the composite side panels 42 and, therefore, is not as susceptible to damage.

Second, if the baserail 52 is damaged by scraping or denting, the baserail 52 may be punched back into place for easy repair since the baserail 52 is preferably formed of metal. If the baserail 52 is damaged by puncture, the entire baserail 52 can be replaced if desired by removing the rivets 78, 112, 116a, 116b along the length thereof, or the damaged portion of the baserail 52 can be cut and removed, and replaced with a new portion of the baserail 52 by either riveting same into place, or by welding the new portion of the baserail 52 to the original baserail 52, or by securing a vertical splice plate between the new portion of the baserail 52 and the original baserail 52. Further, there is no need to replace the scuff plate 49 provided in the semi-trailer 20 of the prior art, which can also be cumbersome.

Third, the connection of the composite side panels 42 to the baserail 52 by the splicing member 80 further helps to prevent or minimize damage to the semi-trailer 20. The splicing member 80 acts as a rubrail along the outer surface of the semi-trailer 20 in order to help prevent damage from sideswipes by other trailers. The splicing member 80 also provides for the baserail 52 to be inset from the outer skin 50 of the composite side panels 42 and the splicing member 80 such that the chance of the baserail 52 being hit or damaged is reduced.

Fourth, the splicing member 80 can be easily replaced if it is damaged by merely removing the rivets 112, 116a, 116b.

The connection of the composite side panels 42 to the baserail 52 by the splicing member 80 also provides the added benefit of stability by clamping or sandwiching the bottom of the composite side panels 42 within and between the splicing member 80 and the baserail 52. Further, such a construction provides for the transfer of shear load vertically from the composite side panels 42 to the baserail 52.

Thus, overall, the semi-trailer 20 having the baserail 52 helps prevent and/or minimize damage to the sidewalls 24 of the semi-trailer 20 and, in the event that the sidewalls 24 are damaged in some manner, the repair or replacement of the sidewalls 24 is made easier by the connection of the baserail 52 to the composite side panels 42 with the splicing member 80.

While a preferred embodiment of the invention is shown and described, it is envisioned that those skilled in the art may devise various modifications without departing from the spirit and scope of the foregoing description and the appended claims.

The invention claimed is:

1. A sidewall for a trailer having a front end and a rear end comprising:
    a bottom rail which extends generally from the front end of the trailer to the rear end of the trailer;
    at least one panel comprised of an inner skin, an outer skin and a core member between said inner skin and said outer skin, said at least one panel having an upper portion, a lower portion and a bottom end, said at least one panel being supported at said bottom end thereof; and
    a baserail having an upper portion and a lower portion, said lower portion of said baserail being secured to said bottom rail and said upper portion of said baserail being secured to said lower portion of said at least one panel such that said baserail vertically separates said at least one panel from said bottom rail and such that said baserail is positioned generally vertically between said at least one panel and said bottom rail, said upper portion of said baserail further being secured to said lower portion of said at least one panel such that an outer surface of said baserail at said upper portion thereof contacts said inner skin of said at least one panel at said lower portion thereof and such that an inner surface of said baserail at said upper portion thereof forms part of a boundary of an interior of the trailer.

2. A sidewall as defined in claim 1, wherein said lower portion of said baserail abuts against an outer surface of an upper portion of said bottom rail.

3. A sidewall for a trailer comprising:
    a bottom rail;
    at least one panel comprised of an inner skin, an outer skin and a core member between said inner skin and said outer skin;
    a baserail having an upper portion and a lower portion, said lower portion of said baserail being secured to said bottom rail; and
    a splicing member which secures said upper portion of said baserail to said at least one panel such that said baserail separates said at least one panel from said bottom rail.

4. A sidewall as defined in claim 3, wherein said splicing member has a first portion, a second portion and a third portion, said first portion abutting said outer skin of said at least one panel, said second portion being positioned below a bottom end of said at least one panel in order to support said at least one panel, said third portion abutting said baserail.

5. A sidewall as defined in claim 4, wherein at least one rivet secures said upper portion of said baserail, said at least one panel and said first portion of said splicing member together, and wherein at least one rivet secures said baserail and said third portion of said splicing member together.

6. A sidewall as defined in claim 4, wherein said first and second portions of said splicing member are generally straight and are generally perpendicular to one another, said second portion of said splicing member extending inwardly from an inner surface of said first portion of said splicing member.

7. A sidewall as defined in claim 6, wherein said second portion of said splicing member extends inwardly from said first portion of said splicing member a distance which is at least as large as a thickness of said at least one panel.

8. A sidewall as defined in claim 6, wherein said third portion of said splicing member has a curved portion and a straight portion, said curved portion extends inwardly and downwardly from a connection between said first and second portions of said splicing member, said straight portion extends from said curved portion and abuts said baserail.

9. A sidewall as defined in claim 8, wherein at least one rivet secures said beserail and said third portion of said splicing member together, said at least one rivet extends through said straight portion.

10. A sidewall as defined in claim 3, wherein said splicing member is an extrusion formed of a high strength material.

11. A sidewall as defined in claim 10, wherein said splicing member is continuous along a length thereof.

12. A sidewall as defined in claim 1, wherein said baserail has a length of fifty-two feet.

13. A sidewall as defined in claim 12, wherein said baserail is continuous along said length thereof.

14. A sidewall as defined in claim 1, wherein said baserail has a height of twenty-two inches.

15. A sidewall as defined in claim 1, wherein said baserail has a thickness of nineteen-hundredths of an inch.

16. A sidewall as defined in claim 1, wherein said baserail is formed of a strong, lightweight material.

17. A sidewall as defined in claim 16, wherein said strong, lightweight material of said baserail is aluminum.

18. A sidewall as defined in claim 1, wherein at least two panels am provided, said at least two panels being connected together by a joint configuration.

19. A sidewall as defined in claim 1, wherein said baserail is inset from said at least one panel.

20. A sidewall as defined in claim 3, wherein said bottom rail generally extends from a front end of the trailer to a rear end of the trailer.

21. A sidewall as defined in claim 3, wherein said baserail abuts against said inner skin of said at least one panel.

22. A sidewall as defined in claim 3, wherein said baserail abuts against an outer surface of said bottom rail.

23. A sidewall as defined in claim 3, wherein said baserail has a length of fifty-two feet.

24. A sidewall as defined in claim 23, wherein said baserail is continuous along said length thereof.

25. A sidewall as defined in claim 3, wherein said baserail has a height of twenty-two inches.

26. A sidewall as defined in claim 3, wherein said baserail has a thickness of nineteen-hundredths of an inch.

27. A sidewall as defined in claim 3, wherein said baserail is formed of a strong, lightweight material.

28. A sidewall as defined in claim 27, wherein said strong lightweight material of said baserail is aluminum.

29. A sidewall as defined in claim 3, wherein at least two panels are provided, said at least two panels being connected together by a joint configuration.

30. A sidewall as defined in claim 3, wherein said baserail is inset from said at least one panel.

31. A sidewall as defined in claim 1, wherein said core member of said at least one panel is formed of a compressible non-metal material.

32. A sidewall as defined in claim 3, wherein said core member of said at least one panel is formed of a compressible non-metal material.

33. A sidewall as defined in claim 1, wherein said upper and lower portions of said baserail are generally co-planar.

34. A sidewall as defined in claim 3, wherein said upper and lower portions of said baserail are generally co-planar.

35. A sidewall for a trailer having a front end and a rear end comprising:
 a bottom rail which extends generally from the front end of the trailer to the rear end of the trailer;
 at least one panel comprised of an inner skin, an outer skin and a core member between said inner skin and said outer skin, said at least one panel having an upper portion and a lower portion; and
 a baserail having an upper portion and a lower portion, said lower portion of said baserail being secured to said bottom rail and said upper portion of said baserail being secured to said lower portion of said at least one panel such that said baserail vertically separates said at least one panel from said bottom rail and such that said baserail is positioned generally vertically between said at least one panel and said bottom rail, said upper portion of said baserail further being secured to said lower portion of said at least one panel such that an outer surface of said baserail at said upper portion thereof faces said inner skin of said at least one panel at said lower portion thereof and such that an inner surface of said baserail at said upper portion thereof forms part of a boundary of an interior of the trailer, said baserail has a lower end, said lower end of said baserail being positioned on top of at least a portion of said bottom rail.

36. A sidewall as defined in claim 3, wherein said baserail has a lower end, said lower end of said baserail being positioned on top of at least a portion of said bottom rail.

37. A sidewall as defined in claim 1, further comprising a splicing member which secures said upper portion of said baserail to said at least one panel, said bottom end of said at least one panel being supported by said splicing member.

* * * * *